United States Patent

[11] 3,592,059

| [72] | Inventor | George E. Chilton |
| | | Haworth, N.J. |
| [21] | Appl. No. | 843,276 |
| [22] | Filed | June 27, 1969 |
| [45] | Patented | July 13, 1971 |
| [73] | Assignee | Computer Diode Corporation |
| | | Fairlawn, N.J. |
| | | Continuation-in-part of application Ser. No. 733,738, May 21, 1968. |

[54] TEMPERATURE MEASURING APPARATUS
12 Claims, 13 Drawing Figs.

[52] U.S. Cl.................................................. 73/362,
73/362.8, 206/16.5
[51] Int. Cl........................................................ G01k 1/20,
G01k 7/24
[50] Field of Search............................................. 206/16.5;
73/362, 362.8; 307/310

[56] References Cited
UNITED STATES PATENTS

| 1,099,199 | 6/1914 | Parker............................ | 73/355 |
| 2,321,846 | 6/1943 | Obermaier..................... | 73/362 |
| 2,938,385 | 5/1960 | Mack............................. | 73/362 |
| 3,147,457 | 9/1964 | Gill................................ | 73/362 |
| 3,254,533 | 6/1966 | Tongret......................... | 73/362 |
| 3,330,158 | 7/1967 | Simonyan..................... | 73/362 |
| 3,379,063 | 4/1968 | Schonberger................ | 73/362 |
| 3,421,375 | 1/1969 | Dimon........................... | 307/310 |

*Primary Examiner*—Louis R. Prince
*Assistant Examiner*—Denis E. Corr
*Attorney*—Darby & Darby ABSTRACT: A disposable heat receptor is placed in heat-absorbing relationship with a body or atmosphere whose temperature is to be measured when the heat receptor reaches the temperature of the environment. The heat receptor is then transferred to an apparatus for measuring of its temperature. Provision is made for a first surface of the heat absorber to be placed in heat exchange relationship with the environment and for a second and different surface to be placed in contact with the sensing element of the temperature-measuring apparatus so that contamination of temperature-measuring apparatus is avoided.

PATENTED JUL 13 1971

GEORGE E. CHILTON,
INVENTOR.

BY Leonard H. King
ATTORNEY

PATENTED JUL13 1971 3,592,059
SHEET 3 OF 3
FIG. 10
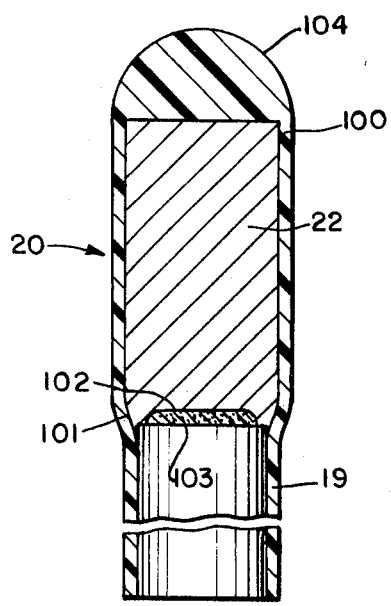
FIG. 11
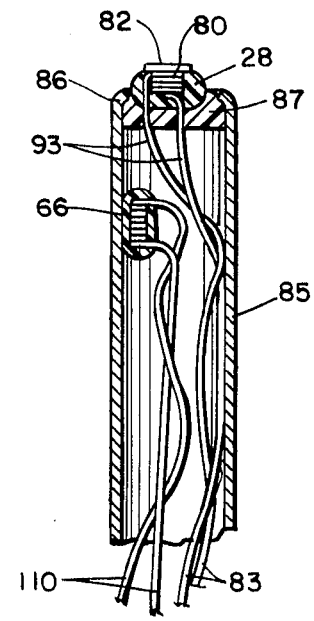
FIG. 11a
FIG. 12
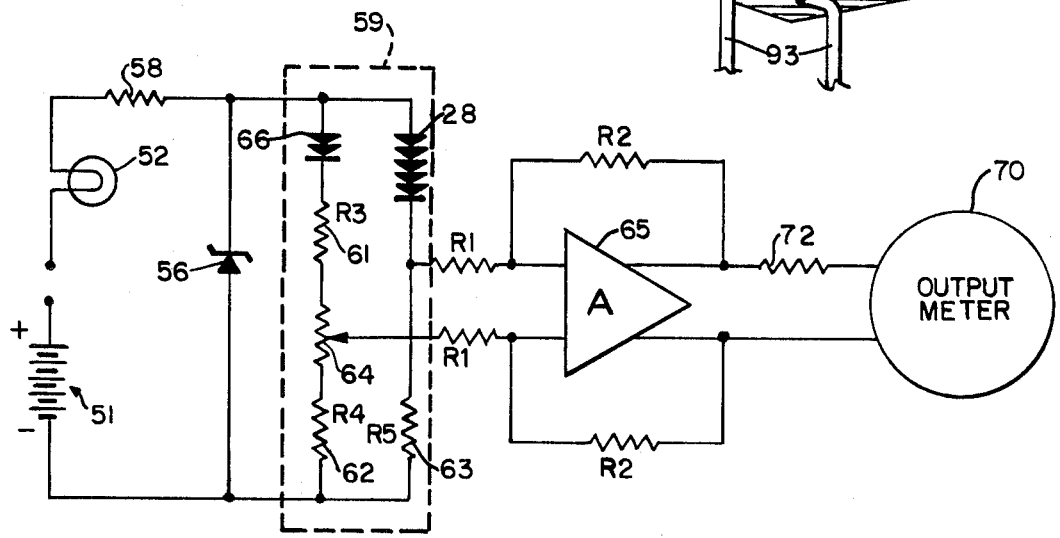

TEMPERATURE MEASURING APPARATUS

This application is a continuation-in-part of my copending application Ser. No. 733,738 filed May 21, 1968 and assigned to the same assignee.

BACKGROUND OF THE INVENTION

The present apparatus is useful for the measuring of temperatures generally but finds particular advantage in the measuring of temperatures of contaminated, corrosive or other environments in which a conventional temperature sensing device would become contaminated or attacked.

One application of the device is as a clinical thermometer particularly for use in hospitals. In this service the conventional mercury thermometer has several disadvantages such as the need for sterilization of the thermometer before reuse to avoid cross infection of patients. Adequate sterilization, it will be appreciated, is a particularly difficult problem because said sterilization must be carried out with nontoxic materials at ordinary room temperature. Another disadvantage is the high rate of breakage of glass thermometers resulting in a high cost per each usage. Other disadvantages include the necessity for shaking down the thermometer after each use, and the long time required for the thermometer to reach equilibrium after being placed in the body cavity, resulting in the consuming of a great deal of the time of doctors and nurses in attendance as well as the difficulty of reading the conventional mercury thermometer, etc. There has been proposed the use of electronic thermometers which are fast reading and which have large dials, so as to be easily read. However, such devices have not been well received by the medical profession because of the difficulty of sterilizing the probes and the ease with which such probes become contaminated by fecal matter and saliva. Accordingly, attempts have been made to provide devices having disposable sensing means. One such approach is shown in U.S. Pat. No. 3,379,063, patented Apr. 23, 1968, by Milton Schonberger. This patent discloses an apparatus which employs a heat collector which is inserted in the body cavity until it reaches the temperature of the environment and which is then removed and inserted in a reader, which is described as a thermistor-type device, and the temperature of the heat collector measured. There are several disadvantages to the Schonberger device which the present invention seeks to overcome.

In the Schonberger device the same surface which is exposed to the contaminated environment is placed in contact with the sensing element. Thus, the sensing element tends to become contaminated by any adhering fecal matter, saliva, or other foreign agent. In addition to the general undesirability of such contamination, the heat conduction characteristics of the surface of the sensing element are changed, rendering suspect any further temperature measurements.

SUMMARY OF THE INVENTION

Contrary to the teachings of the Schonberger patent, in which the heat-absorbing mass is a viscous or semisolid material of poor thermal conductivity, it has been found advantageous to use a material of high thermal conductivity with high heat capacity. By use of a novel arrangement good heat transfer from the heat collector to the sensor is obtained. Presently, iron is the preferred heat absorber since it has excellent thermal conductivity and heat capacity at the lowest cost per unit volume of all known materials. the low cost of the heat absorber makes feasible its use as a disposable item.

Accordingly, it is an object of this invention to provide an improved temperature sensing device.

It is another object of this invention to provide an improved clinical thermometer.

A further object is to provide an improved, heat-absorbing element for a temperature-measuring device of the type described.

A different object is to provide an improved temperature-sensing element.

A further object of this invention is to provide a temperature-sensing device employing a heat absorber for insertion in an environment whose temperature is to be measured and an external device for sensing the temperature of the heat absorber wherein provision is made for disposal of the heat absorber without touching of contaminated surfaces.

These and other objects, features and advantages of the invention will, in part, be pointed out with particularity and will, in part, become obvious from the following more detailed description of the invention taken in conjunction with the accompanying drawing which forms an integral part thereof.

DESCRIPTION OF THE DRAWING

FIG. 10 is a sectional view of the heat transfer probe in another and preferred embodiment of the invention;

FIG. 11 is a sectional view of the temperature sensor probe showing a preferred position of an ambient temperature compensating element;

FIG. 11a is an enlarged pictorial view of a preferred embodiment of a multijunction sensor; and FIG. 12 is a circuit diagram of the apparatus depicting inclusion of the ambient temperature-compensating element of FIG. 11.

DESCRIPTION OF THE PREFERRED EMBODIMENT

Figure 1:
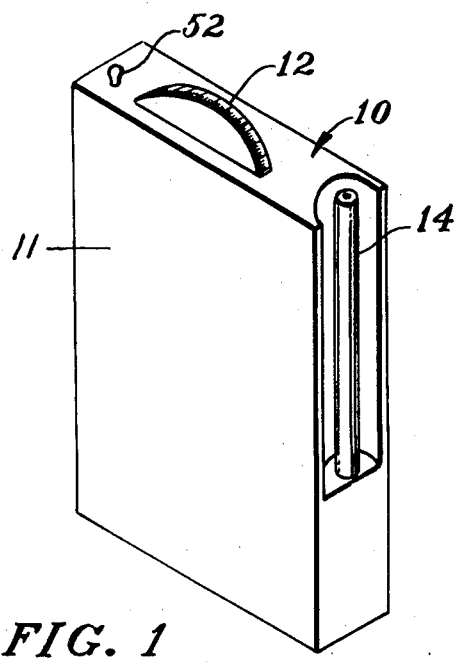
FIG. 1 is a partially broken away view of a readout instrument.
Figure 2:
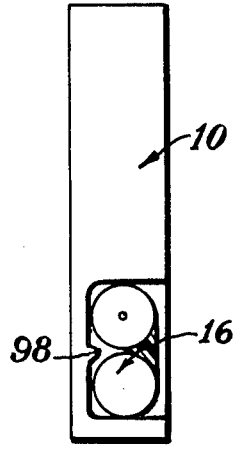
FIG. 2 is an end view of the instrument of FIG. 1 with the battery access opening in open position.

Referring to FIGS. 1 and 2, there is shown a temperature-measuring apparatus 10 which includes a case 11, meter movement 12, a sensing rod 14 and a source of power 16. A heat receptor 20 (shown in FIG. 3) comprises a stem 19 formed of a plastic tube which may be extruded or otherwise formed of cellulose acetate, polystyrene, polyethylene, polypropylene, or other suitable plastic. Fitted into the end of the tube and held in any suitable way, as in a tight frictional grip, there is provided an iron slug 22 approximately one-fourth inch in diameter by one-half inch long. A typical weight of this slug is from one to three grams.

Reference to FIG. 10 indicates another and preferred embodiment of the heat receptor 20. In this embodiment the slug 22 is completely internal to the thin plastic covering 100. The plastic covering 100 includes a tubular stem 19 with a rounded solid plastic tip 104. The slug 22 itself has chamfered ends 101 for ease of assembly into the tube and a recess 103 for insertion of a heat-conducting compound, as discussed below.

Figure 3:
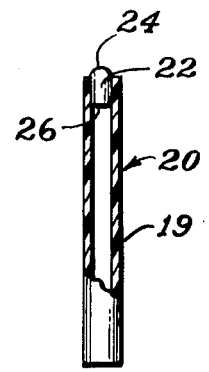
FIG. 3 is a partially broken away pictorial view of a h eat transfer probe.

Grasping the stem 19, the user inserts the end containing the iron slug 22 into the body cavity or other environment to be measured. The arrangements shown in FIGS. 3 and 10 provide excellent heat transfer from the environment to the absorbing slug 22. For an iron slug having a diameter of a quarter of an inch and a length of about one-half inch, the mass will achieve stable temperature in the form 3to 5 minutes. This time is dependent on the thermal transfer between slug and environment, and will differ when the ambient environment is wet or dry. If the probe slug is left in position for at least 5 minutes, there is complete assurance that the maximum temperature has been substantially achieved.

Figure 4:
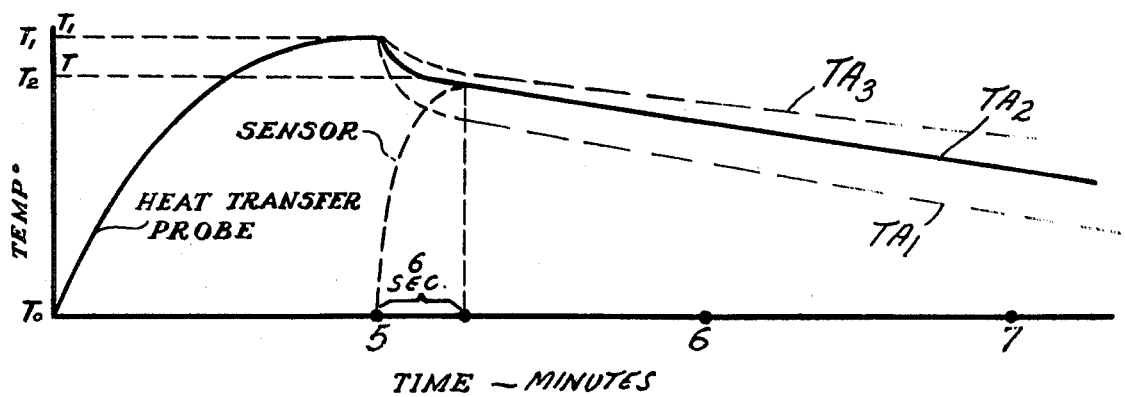
FIG. 4 is a graph showing temperature versus time relationship of the heat transfer probe and sensing element during different portions of the temperature-measuring cycle.
Figure 5:
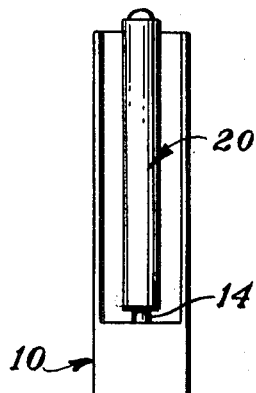
FIG. 5 is an end view in elevation of the apparatus of FIG. 1, with the heat transfer probe in reading position.

Referring to FIG. 4, there is shown a graph which indicates the rise in temperature of the heat absorbing slug from $T_0$, which would normally be room temperature, to $T_1$, the temperature of the environment. The operator then removes the heat receptor 20 from the body cavity by means of the stem 19, thus avoiding any direct contact with the patient, and slips the hollow portion of the stem over rod 14, as shown in FIG. 5.

Figure 8:
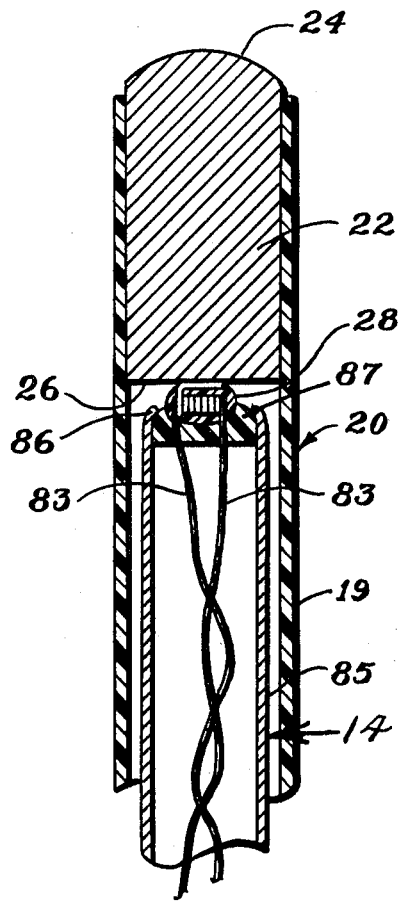
FIG. 8 is an elevational view in section of the heat transfer probe in contact with the sensing element.

Referring to FIG. 8 for greater detail, this places inner surface 26 of the probe slug in intimate contact with a sensing element 28 at the tip of the rod. While the sensing element 28 may be thermistor or thermocouple, I presently prefer to use a multijunction diode-sensing element such as disclosed in U.S. Pat. No. 3,330,158. When the heat receptor embodiment of FIG. 10 is used with the sensor rod 14, the temperature-sensing multijunction diode 28 is juxtaposed to and is pressed against the thermal-conducting compound in the recess 103. A recess 103 is used so that the amount of conducting compound is the same for each heat receptor 20. A preferred conducting compound is silicone grease-containing zinc oxide; however, other conducting compounds may prove advantageous. It has also been found that a bearing force of at least 3 but preferably approaching 10 grams should be exerted on the heat receptor 20 against the sensor rod 14 to produce an optimum grease film thickness for maximum heat transfer. Should the gross weight of the heat receptor 20 be less than that considered optimum for the above bearing force, it may be augmented by suitable mechanical means designed to increase this force. Such means may include the use of manual pressure, magnetic attraction of the ferrous heat receptor head 22, or any of several possible mechanical linkages readily apparent to those skilled in the art to apply increased bearing force to the heat receptor assembly 20. It is preferred that this means be applied to the inner surface of stem 19 or its extreme lower end, so that the principle of noncontamination of critical parts be preserved.

Upon inserting the heated slug of the heat receptor 20 in the readout instrument the high thermal conductivity of the slug 22 and the high thermal conductivity of the diode 28 cooperate to quickly heat the diode 28 to the temperature of the slug 22 with minimal reduction in the temperature of the slug. Since the mass of the slug is many times greater than the mass of the diode, the temperature drop of the slug resulting from heating of the sensor is not appreciable. An influencing factor on this heat drop is the temperature of sensing rod 14. If the sensing rod 14 is initially at one ambient temperature then the temperature decay of the slug is shown by curve $T_{A2}$ for example. For some other ambient temperature condition or when there has been a temperature rise in the sensor rod 14 as a result of repeated readings, $T_{A1}$ or $T_{A3}$ (dotted line) may be the appropriate slug decay curves. It can be seen from FIG. 4 that the heat transfer to the sensor depends on which slug decay curve governs.

If a fairly uniform ambient temperature condition is maintained, an average decay curve could be chosen (e.g. $T_{A2}$) and the heat drop from $T_1$ to $T_2$ could be taken into account by meter scale calibration alone. Full ambient temperature compensation, however, requires more sophisticated means to be explained at a later point in this specification.

The reading is taken typically after 1 to 5 minutes of insertion in the patient, when the heat receptor probe 20 is transferred to the sensing rod 14. The curve of FIG. 4 indicates that this time is not critical, since readings encompassing substantially less duration (for example after 3 minutes) may also be taken with only a small sacrifice in accuracy. Readings taken long after 5 minutes of the heat receptor 20 being in the patient will probe only slightly more accurate. The measurement of the slug temperature by the sensor must, however, be taken in a short time; 10 seconds is an appropriate time but a measurement in less than 6 seconds is preferable. This is necessary to prevent excessive heat loss to the sensing rod 14.

After the operator has finished reading the temperature of the probe, it may be readily discarded without touching it with the hand by merely turning the instrument upside down over a receptacle. This avoids another problem of the prior art device employing a viscous fluid or semisolid, which necessitates physically pulling off the heat absorber from the temperature sensor.

Figure 7:
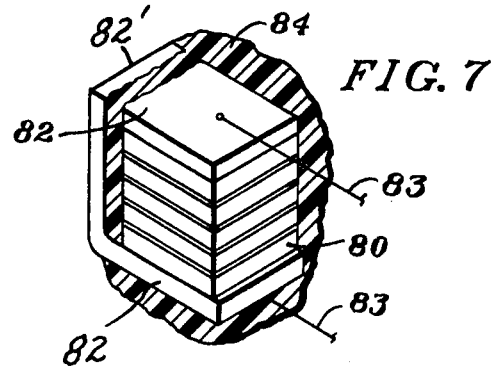
FIG. 7 is a pictorial view of a multijunction diode type sensing element.

One embodiment of the temperature sensor, which is a multijunction diode stack, is shown in FIG. 7. The individual diodes 80 (five being shown by way of example) terminate in silver end members 82, to which are connected extremely fine stainless steel leads 83. The leads provide good electrical conductivity with poor thermal conductivity. The latter characteristic is important for minimizing heat loss from the sensing element. From one side of the diode stack, a flattened silver ribbon 82' extends, covering the face of the stack, and is electrically insulated therefrom by epoxy resin 84. The ribbon 82' is in thermal contact with the slug 22 and conducts heat directly into the diode stack.

A preferred embodiment of the temperature sensor, however, is shown in FIG. 11a which is embodied in the probe of FIG. 11. In that embodiment, the diode stack is oriented parallel to the longitudinal axis of support tube 85. A silver ribbon 82 extends over an end face of the stack which has exposed diode junction edges and is electrically insulated therefrom by epoxy resin 84. The ribbon 82 is in direct mechanical and electrical contact with the end face of the stack and therefore provides excellent heat transfer between those elements. Leads 93 are attached as shown in FIG. 11a to the underside of ribbon 82 and the opposite end of the diode stack. The ribbon end of the stack is in thermal contact with the slug 22 and conducts heat directly into the diode stack.

FIG. 8 shows the sensing rod assembly 14 in greater detail. Support tube 85 contains at the top 86 a silicone rubber plug 87 in which is embedded the sensor 28. Support tube 85 is preferably constructed with a metal exterior layer for structural rigidity and a wood or other nonheat-conducting interior layer. Alternatively, the entire tube may be simply any rigid nonheat-conducting material such as epoxy.

Figure 6:
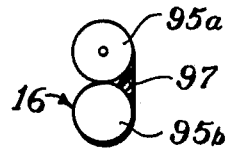
FIG. 6 is a pictorial view of a battery for the apparatus.

To energize the instrument it has been found convenient to employ two battery cells 95a, 95b, in series as shown in FIG. 6. The two cells are preferably provided as a common unit joined together with one side of the arcuate common area filled in with a resin 97 so that the assembly can be inserted into the instrument battery cavity only in the proper orientation because of the keying effect of rib 98 (see FIG. 2). This arrangement does not forestall the use of commonly available single batteries if the preferred composite is not available.

Figure 9:
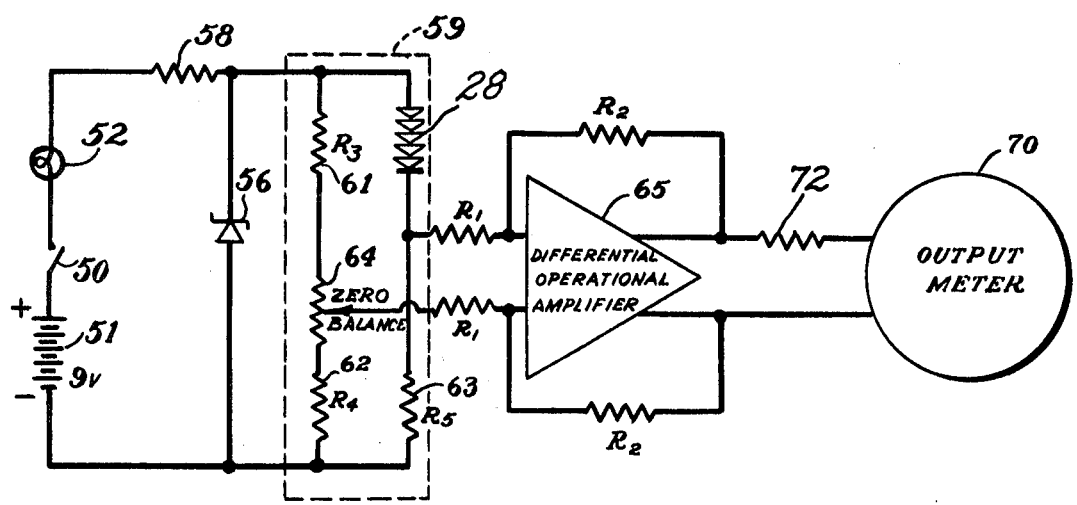
FIG. 9 is a circuit diagram of one embodiment of the apparatus.

In FIG. 9 there is shown diagrammatically a suitable circuit diagram for use in conjunction with the multijunction diode 28. Switch 50 closes a circuit to battery 51 which energizes series-connected pilot lamp 52, which indicates to the operator that the device has been energized. Zener diode 56 in conjunction with dropping resistor 58 and lamp 52 act as a voltage regulator. The power is then supplied to the diagonals of a differential sensing bridge 59, one arm of which is multijunction diode 28 and the other arms are resistors 61, 62 and 63. In series with bridge arms 61 and 62, there is provided a potentiometer 64 for initial adjustment of the circuit. This potentiometer may be of the trimmer type. The output of the bridge is fed to a differential operational amplifier 65 and the opposed outputs are applied to an appropriate meter movement 70. A fixed resistor 72 is provided in series with the meter for gain adjustment purposes. In place of resistors 61, 62 and 63, junction diodes may be employed. This latter arrangement is disclosed, for example, in U.S. Pat. No. 3,330,158. The circuit of FIG. 9 is typical of the use of the temperature measuring apparatus without compensation for ambient temperature changes.

A preferred arrangement which compensates for changes in ambient temperature and possible changes in temperature of the sensing rod 14 as a result of repetitive measurement is shown in FIGS. 11 and 12. In FIG. 11, the physical position of compensating element 66, typically a junction diode, is shown. The compensating diode 66 preferably has stainless steel leads 110 also. The compensating diode 66 is placed internal to sensor rod 14 and is preferably free floating, that is, supported mainly by its own leads and the confining nature of sensing rod 14. It may also be fastened to the internal surface of support tube 85 by appropriate means. The diode position in the preferred orientation is approximately one-half inch below the top of the sensor rod 14. This achieves an optimum thermal time constant when successive readings are taken.

The circuit implementing the ambient temperature compensation is shown in FIG. 12. If there were no thermal losses, the number of junctions needed to compensate for changes in sensing rod temperature would be the same as the number in the sensing diode 28. However, the thermal losses involved reduce the number of junctions in the preferred case to one or two. Thus, if the sensing diode 28 has five junctions, the diode output would change corresponding to change in temperature by 10millivolts per degree centigrade in the direction opposite to the change in temperature. The compensating diode would preferably change by 2to 3 millivolts per degree centigrade opposite to the direction of temperature change. This could be achieved by a single junction if desired. With a single junction the preferred ratio of resistance of $R_4$ (64) to that of $R_3$ (61) is 5:1. Appropriate resistor division of $R_3$ and $R_4$ could produce the desired compensation from a compensating diode 66 having several junctions.

It is desirable to use low temperature-coefficient resistors for $R_3$, $R_4$, $R_5$ and the trimming resistor 64 so that the only element supplying temperature compensation is compensating diode 66.

In summary, it is pointed out that the present apparatus overcomes certain of the deficiencies of the prior art; for example, no part of the probe in contact with the patient actually touches the instrument, thus avoiding any danger of contamination of the instrument. Further, the heat absorber element is of extremely low cost and may be regarded as a disposable item. The open construction of the reading instrument facilitates maintaining it in a sanitary condition.

Accordingly, while there have been described what are considered to be the preferred embodiments of this invention, it will be obvious to those skilled in the art that various changes and modifications may be made without departing from the invention and it is, therefore, aimed to cover all such changes and modifications as fall within the true spirit and scope of the invention.

I claim:

1. A disposable clinical heat constructed and heat transferring probe adapted for heat-absorbing use independent of associated measuring equipment comprising:

an elongated tubular body being constructed of low thermal conductivity material and open at one end;

and a metal slug having high thermal conductivity and substantial thermal capacity occupying the other end of said body and having an accessible thermally conductive surface on the inside of said body, said surface facing the open end of said body, said slug being capable of absorbing the heat energy from an environment until it attains substantially the temperature of said environment so that an accurate indication of said environmental temperature may subsequently be obtained from said accessible thermally conductive surface by heat transference through said accessible conductive surface to associated measuring equipment, said probe having an external surface at the slug end for exposure to said environment to be measured, whereby any contamination present in said environment is only exposed to said external surface of said probe and contamination is prevented from interfering with the heat transference through said internal conductive surface to the associated measuring equipment, the measuring equipment thereby avoiding contact with said contaminated external surface during measurement therefore insuring an accurate indication of measured temperature and avoiding contamination of the measuring equipment.

2. The probe described in claim 1, wherein said slug is of ferrous material.

3. The probe described in claim 1, wherein the elongated tubular body is made of a heat insulating material.

4. In combination with the probe of claim 1, temperature-measuring apparatus comprising:

a rod adapted for insertion into the open end of said probe;

thermally responsive means mounted on one end of said rod and adapted to be brought into physical contact with said thermally conductive surface of said slug when said rod is inserted in said probe and also responsive to said slug temperature, said means providing an electrical signal proportional to the temperature of said slug; and means responsive to said electrical signal for visually displaying an indication if said slug temperature corresponding to that of said measured environment.

5. In combination with the probe of claim 1, temperature measuring apparatus comprising:

a rod adapted for insertion into the open end of said probe;

thermally responsive means mounted on one end of said rod adapted to be brought into physical contact with said thermally conductive surface of said slug when said rod is inserted into said probe and also responsive to said slug temperature, said thermally responsive means providing an electrical signal proportional to the temperature of said slug;

means for compensating for temperature changes of said slug due to heat exchange between said slug and an ambient measuring environment, said environment including the measuring apparatus, said compensating means also compensating for local heat accumulation in said rod as a result of repetitive readings; and means responsive to said thermally responsive means and ambient temperature-compensating means for visually displaying an indication of temperature accurately corresponding to the environment to be measured by said probe.

6. Temperature-measuring apparatus adapted for use with an independent, heat absorbing and heat transferring probe, said probe having a tubular body open at one end and a metal slug occupying the other end of said body and having an accessible thermally conductive surface on the inside of said body, said slug being capable of absorbing heat energy from an environment until it attains substantially the temperature of said environment, comprising:

a rod adapted for insertion into the open end of said probe;

a multiple junction diode stack mounted on one end of said rod and adapted to be brought into physical contact with said thermally conductive surface of said slug when said rod is inserted in said probe and also responsive to said slug temperature, said stack providing an electrical signal proportional to the temperature of said slug, said stack also including a metal end plate on the stack arranged to contact said thermally conductive surface of said slug, said metal end plate being formed of highly thermally conductive material; and means responsive to said thermally responsive means for visually displaying an indication of temperature accurately corresponding to the environment to be measured by said probe.

7. Temperature measuring apparatus as described in claim 1 wherein said diode includes a pair of stainless steel leads.

8. Temperature-measuring apparatus as described in claim 6, wherein said means responsive to said electrical signal includes a bridge arrangement in which one leg of said bridge comprises said multiple junction diode stack.

9. A multiple junction temperature-sensing diode stack for use with temperature-measuring apparatus comprising:

a two-terminal semiconductor diode, having a plurality of stacked junctions, wherein each intermediate junction has an anode in direct physical and electrical connection with a cathode of an adjacent junction, and each intermediate junction has a cathode in physical and electrical contact with an anode of an adjacent junction, and wherein one outer junction has an anode connected to a first terminal and the other outer junction has a cathode connected to a second terminal, said diode being adapted to sense temperature of a body in physical contact with said stack and to provide a voltage across said two terminals proportional to the temperature of said body; and a metal end plate in contact with one of said terminals for large surface contact with said body.

10. An ambient temperature-compensated bridge circuit comprising:

a resistor of predetermined value forming a first branch of said bridge circuit;

a resistor of predetermined value connected to said first branch, forming a second branch of said bridge circuit;

a thermally responsive forming a third branch of said bridge circuit, and capable of providing a voltage output proportional to the temperature of an applied body containing absorbed heat energy, said body having a temperature higher than an ambient environment temperature and wherein the temperature of said body is dropping due to heat energy loss to said ambient environment; and temperature-compensating means, positioned a predetermined distance from the sensing means, in a fourth branch of said bridge, having a voltage output proportional to the ambient temperature of the environment, the slope of the voltage-temperature characteristic of said compensating means being less than that of said sensing means, whereby the bridge error signal is proportional to the temperature of said applied body and ambient temperature effects are substantially eliminated.

11. The compensation circuit of claim 10 wherein the sensing means is a multiple junction diode and the compensating means includes a multiple junction diode of fewer junctions than the sensing means diode.

12. An ambient temperature compensated bridge circuit comprising a resistor of predetermined value forming a first branch of said bridge circuit;

a resistor of predetermined value connected to said first branch, forming a branch of said bridge circuit;

a thermally responsive means forming a third branch of said bridge circuit, and capable of providing a voltage output proportional to the temperature of an applied body containing absorbed heat energy, said body having a temperature different from an ambient environment temperature and wherein the temperature of said body is changing due to heat energy exchange with said ambient environment, and temperature-compensating means, positioned a predetermined distance from the sensing means, in a fourth branch of said bridge, having voltage output proportional to the ambient temperature of the environment, the slope of the voltage temperature characteristic of said compensating means being less than that of said sensing means whereby the bridged error signal is proportional to the temperature of said applied body and ambient temperature effects are substantially eliminated.